United States Patent [19]

Tagliaferri

[11] 3,965,422

[45] June 22, 1976

[54] SYSTEM CHANNEL DISTORTION WEIGHTING FOR PREDETECTION COMBINERS

[75] Inventor: Olindo A. Tagliaferri, Rome, N.Y.

[73] Assignee: The United States of America as represented by the Secretary of the Air Force, Washington, D.C.

[22] Filed: July 26, 1974

[21] Appl. No.: 492,077

[52] U.S. Cl. ................................ 325/305; 325/56; 325/411; 325/472; 343/205
[51] Int. Cl.² .......................................... H04B 7/02
[58] Field of Search ............ 325/56, 301, 302, 305, 325/306, 400, 410, 411, 472–477, 484; 343/200, 205

[56] References Cited

UNITED STATES PATENTS

| 3,641,437 | 2/1972 | Gurak et al. | 325/305 |
| 3,681,695 | 8/1972 | Cease et al. | 325/305 |
| 3,831,095 | 8/1974 | Mounce | 325/302 |

Primary Examiner—Robert L. Griffin
Assistant Examiner—Marc E. Bookbinder
Attorney, Agent, or Firm—Joseph E. Rusz; William Stephanishen

[57] ABSTRACT

A tropo system channel distortion weighting apparatus for predetection combiners for modifying the predetection combiner algorithm to improve the output carrier to noise ratio in the presence of signal distortion.

1 Claim, 13 Drawing Figures

SYSTEM CHANNEL DISTORTION WEIGHTING FOR PREDETECTION COMBINERS

BACKGROUND OF THE INVENTION

The present invention relates broadly to a troposcatter radio system and in particular to a tropo system channel distortion weighting apparatus for predetection combiners.

The method or system of transmitting microwaves within the troposphere to effect radio communication between two points on the earth's surface has been utilized in many areas of intelligence communications. The troposphere is the lower layer of the earth's atmosphere which extends to about 60,000 feet at the equator and 30,000 feet at the poles. The use of tropospheric scattering provides the means for communicating over moderate distances of from 70 to 600 miles. However, such a span may be augmented by other spans in tandem to permit end to end or through circuits up to many thousand miles. Thus, the maximum range for wireless communications at frequencies from several hundred megacycles on up into the microwave no longer depends on the line of sight distance between the transmitter and receiver which was severely limited by both the earth's curvature and intervening physical obstacles, such as mountainous terrain. However, it is well known that maximal ratio predetection diversity combining is optimum for channels subject to flat (non-frequency selective) amplitude and phase fading. On most practical links of interest such as troposcatter, the classical flat fading channel model is not appropriate. Instead, significant channel distortion is experienced such that a significant probability exists that a channel will have both a high signal to thermal noise ratio and high signal distortion. The present invention solves the problem of capture by a strong but distorted signal and weighs each of the four input IF channels according to the ratio of undistorted signal to signal distortion plus thermal noise.

SUMMARY

The present invention utilizes a carrier-to-noise ratio combining technique which examines the carrier-to-noise ratio of each diversity input as well as the amount of distortion on each input signal and adjusts the combining weighting to maximize output carrier-to-noise ratio. The channel distortion weighting apparatus prevents the capture of a classical predetection combiner by a strong but distorted signal which would otherwise greatly degrade the link performance. A distorted diversity signal can only degrade the signal to noise ratio at the receiver output. The channel distortion weighting apparatus prevents diversity signals with relatively larger distortion from contributing to receiver output and thereby improves overall link performance.

It is one object of the invention, therefore, to provide an improved channel distortion weighting apparatus to prevent the predetection combiner from capturing strong but distorted signals.

It is another object of the invention to provide an improved channel distortion weighting apparatus that utilizes a prior knowledge of the form of the undistorted signal to evaluate the overall quality of received signals.

It is yet another object of the invention to provide an improved channel distortion weighting apparatus which utilizes the effective amplitude modulation index of each diversity receiver channel as a measure of signal quality.

These and other advantages, objects and features of the invention will become more apparent from the following description taken in connection with the illustrative embodiment in the accompanying drawings.

DESCRIPTION OF THE PREFERRED EMBODIMENT

The present invention provides the ability for the predetection combiner to prevent capture by strong but distorted signals by using a prior knowledge of the form of an undistorted signal. That is, in some form, evaluate the overall quality of each of the received IF signals to be used to weight the four individual channels on a system approach. Long haul troposcatter systems in existence today use post detection combiners and the out-of-band noise detector as a measure of both signal quality and strength. The present invention utilizes the effective amplitude modulation index of each diversity channel as a measure of its quality. The diversity signal, as transmitted, may contain amplitude fluctuation which results in an effective amplitude modulation index. The channel multipath distortion as well as channel thermal noise will tend to increase the relative size of these fluctuations and therefore increase the amplitude modulation index. This measure can thus be used to weight each input IF channel according to its quality without regard to the type of signal transmitted. The use of predetection combining has the advantage over the baseband combiner in the FM threshold region because all usable diversity signals are combined before detection instead of being demodulated individually and then combined as accomplished in a baseband combiner. This in turn will result in lowering the FM threshold.

Figure 1:
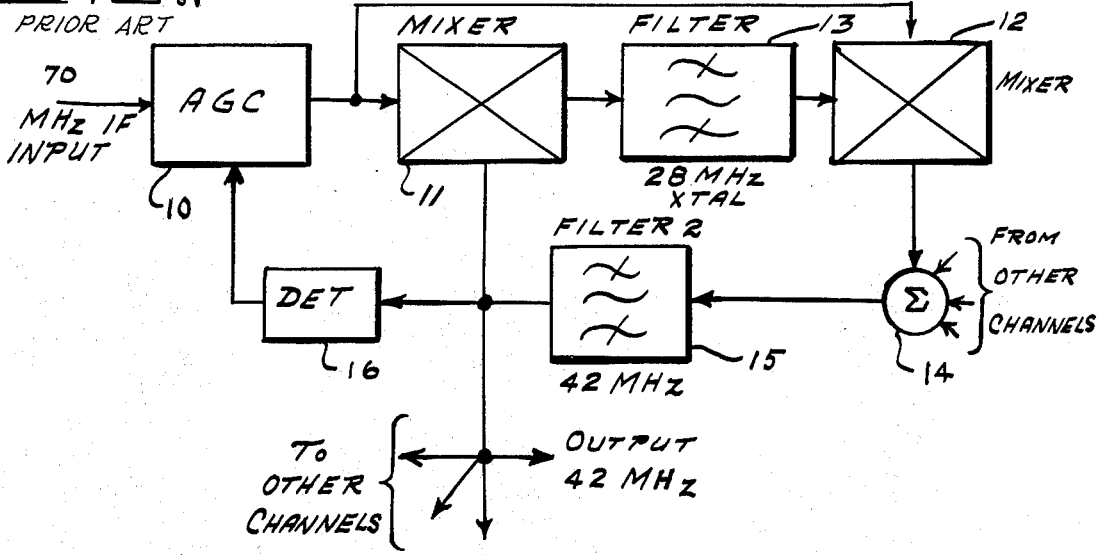
FIG. 1 is a block diagram of a prior art predetection combiner.

Turning now to FIG. 1, there is shown a prior art predetection combiner apparatus utilizing an AGC unit 10 to receive the system 70 MHz IF. input signal. The output signal of the AGC unit 10 is applied simultaneously to mixer units 11, 12. The output of mixer 11 is filtered in filter unit 13 and applied to mixer unit 12. The output signal of mixer unit 12 is applied to summing unit 14 which sums this signal with the output signals from the other system channels (not shown).

The summed output signal from summing unit 14 is filtered in filter unit 15 and applied simultaneously to detector unit 16 and to the other system channels (not shown) in the troposcatter radio system. The detector unit 16 applies its output signal to AGC unit 10 to condition the incoming 70 MHz I.F. input signal.

Figure 2:
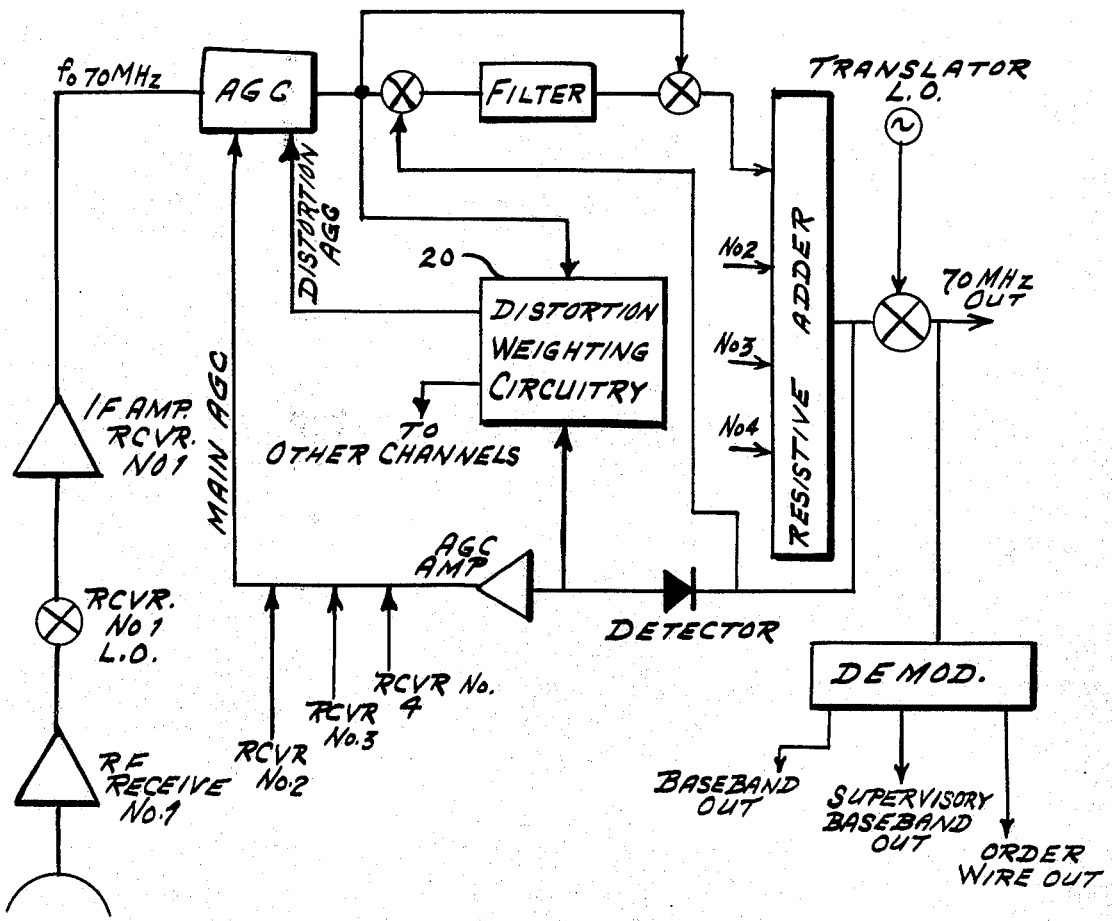
FIG. 2 is a block diagram of a basic four channel predetection combiner modified to include the system channel distortion weighting apparatus according to the present invention.

There is shown in FIG. 2 one channel of a basic four channel predetection combiner which has been modified to include a distortion weighting unit 20. In FIG. 2, the distortion weighting unit 20 correlates the amplitude distortion of the summed input signal against the amplitude distortion on each input channel. The channel with the highest correlation will be attenuated the most. This process never resets, it is always working to minimize output distortion in a mean square sense for the combination of the four channels.

Figure 3:
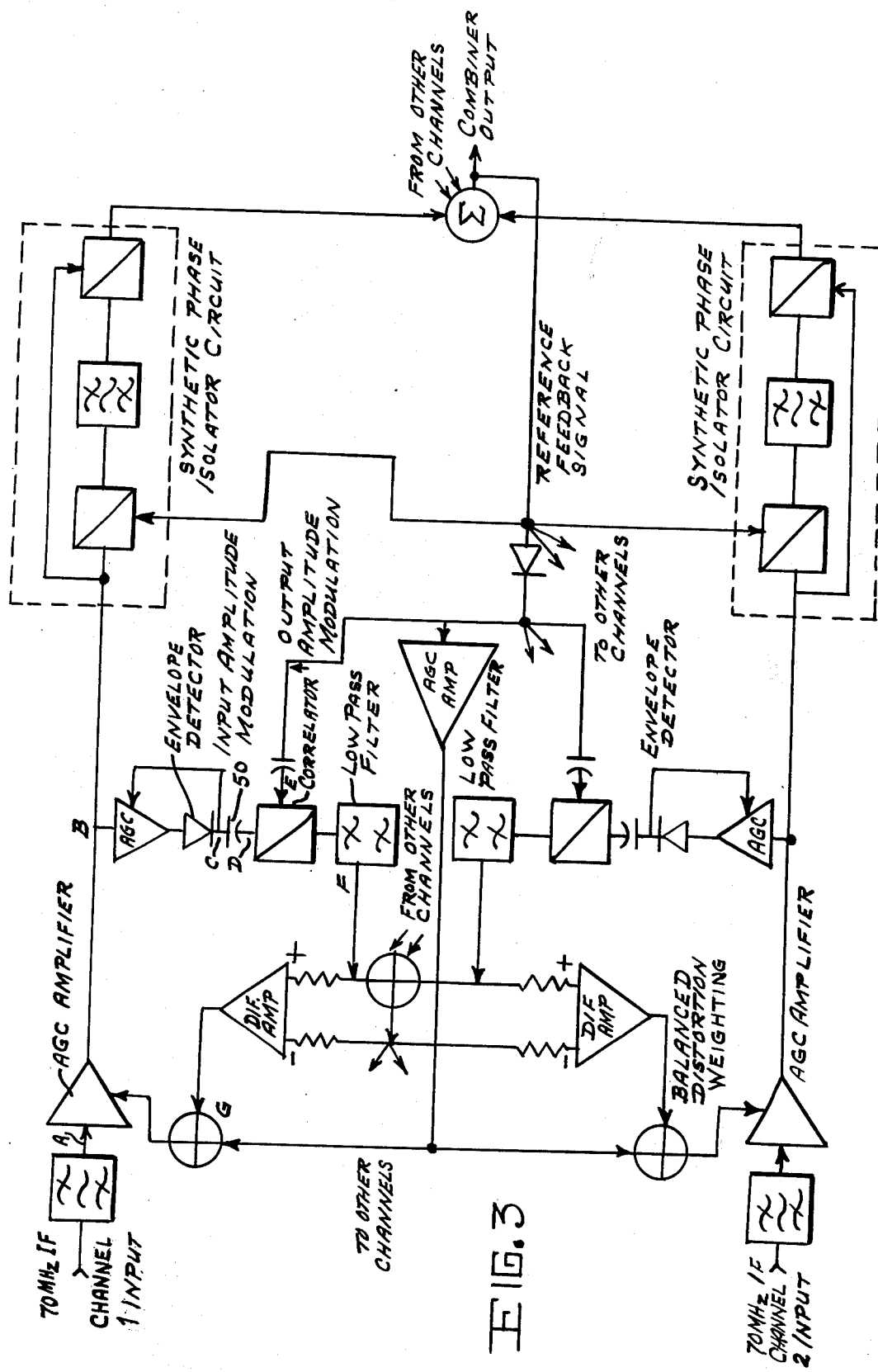
FIG. 3 is a block diagram showing the system channel distortion apparatus in greater detail in system operation.
Figure 4:
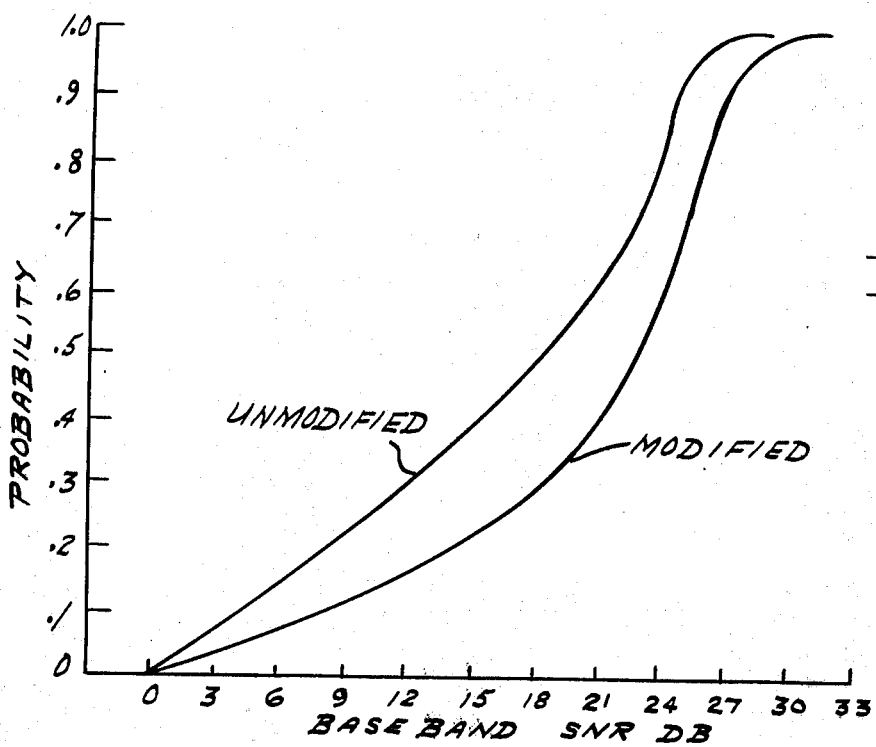
FIGS. 4 through 11 are graphical representations of the probability distributions and densities of a modified and unmodified four channel predetection combiner, respectively, and, FIGS. 12 and 13 are graphical representations of the errors in reception between a modified and unmodified four channel predetection combiner.

FIG. 3 shows the system channel distortion weighting apparatus for a two channel predetection combiner, the other two IF channels which are not shown, being the same. As the input signal becomes distorted due to multipath propagation, unequal gains, excessive thermal noise, etc., These amplitude fluctuations will increase with respect to the higher quality channels. By measuring the strength of the AC component of each signal envelope with respect to its average DC component, a measure of channel quality is thus obtained which reflects both channel distortion and background noise. With distortion weighting of this type, the predetection combiner operation becomes relatively independent of signal parameters.

The operation of the system channel distortion weighting apparatus of FIG. 3 will be better understood by the following discussion of the signal paths and waveforms in the present circuit. The discussion will refer only to one half of the circuit shown, however, it applies equally to the other portion of the block diagram since they are mirror images of each other. The diversity channel input signal which appears at point A is an amplitude distorted signal which was induced by channel distortion plus thermal noise. At point B, the diversity channel signal is the same as at point A except that the signal has been processed by the main AGC gain. The main AGC is utilized to control the level of the output signal. After envelope detection of the channel signal by the envelope detector, the signal at point C is an envelope (no carrier present) at a constant rms value. The envelope of point C is filtered in high pass filter 50 to remove the DC component and to provide the AC component of the envelope which is now proportional to the percentage amplitude distortion of the signal. The signal at point D is the envelope of point C (the AC component of the envelope) referenced about the baseline, zero. At point E, the AC component of amplitude fluctuations of the combiner output appear. There can be one of two possible conditions. In case 1, the input channel envelope to point D contributes most to output distortion. In case 2, another channel contributes most to output distortion. In other words, the signal at point E is different from the signal at point D.

At point F, the filtered output of the correlator appears as the correlation between the single channel distortion envelope and the combiner output distortion envelope. In the present example, the correlation between point D and E is D times E for either case 1 or case 2. In case 1, the result is some positive voltage. In case 2, the result is approximately zero DC. A dc value at correlator output will occur only when diversity input in question is significantly contributing to distortion on the output. Resultant dc signal is then used to turn down gain on that channel. At point G, the output of the difference amplifier is the difference between individual channel distortion level (dc proportional voltage) and a reference distortion level. For case 1, the individual channel distortion is greater than the reference distortion. Therefore, the output at point G is voltage which reduces gain of that channel. For case 2, the individual channel distortion is less than the reference distortion. Therefore, the output at point G would be a voltage which increases the gain of that channel. The difference amplifier insures that the diversity channel is not attenuated more than necessary. Thus, if all inputs are distorted, the difference amplifier will tend to minimize the output distortion by preventing any single channel to contribute to this distortion more than others.

Figure 12:
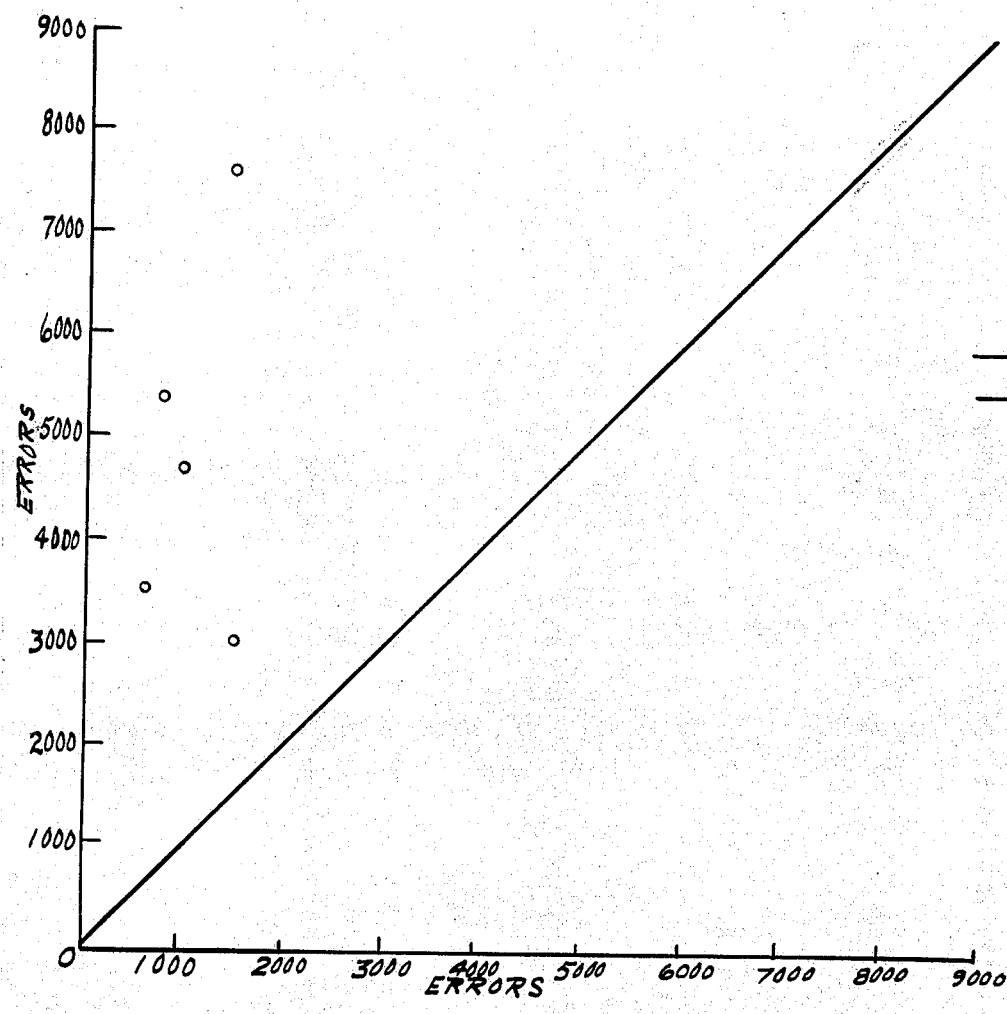
Figure 5:
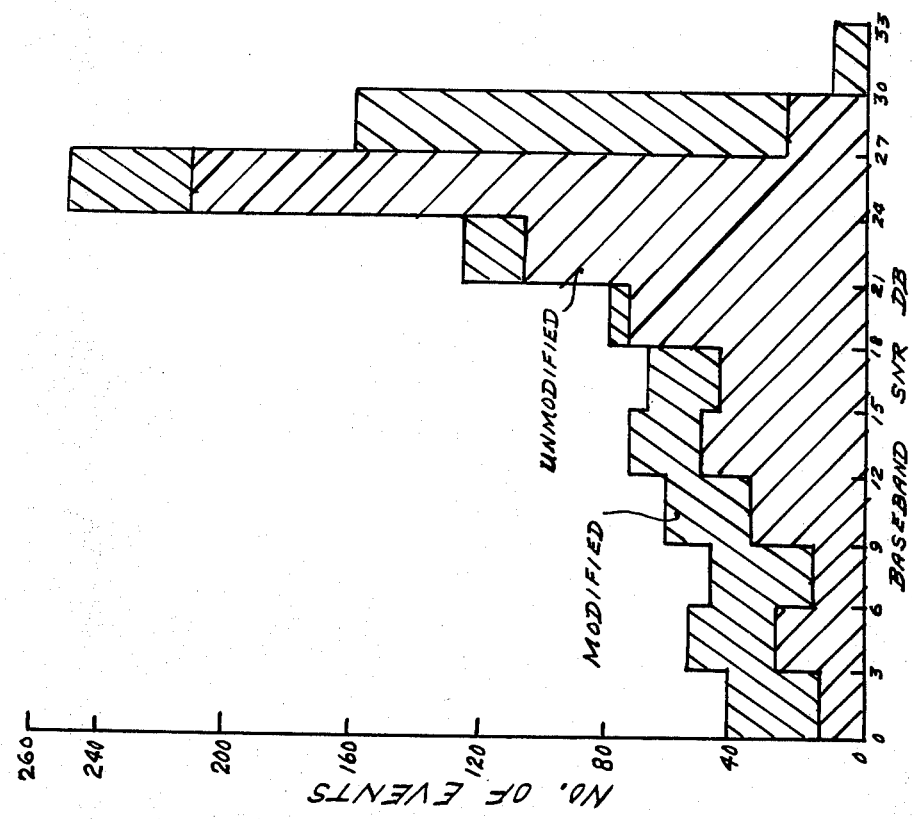
Figure 7:
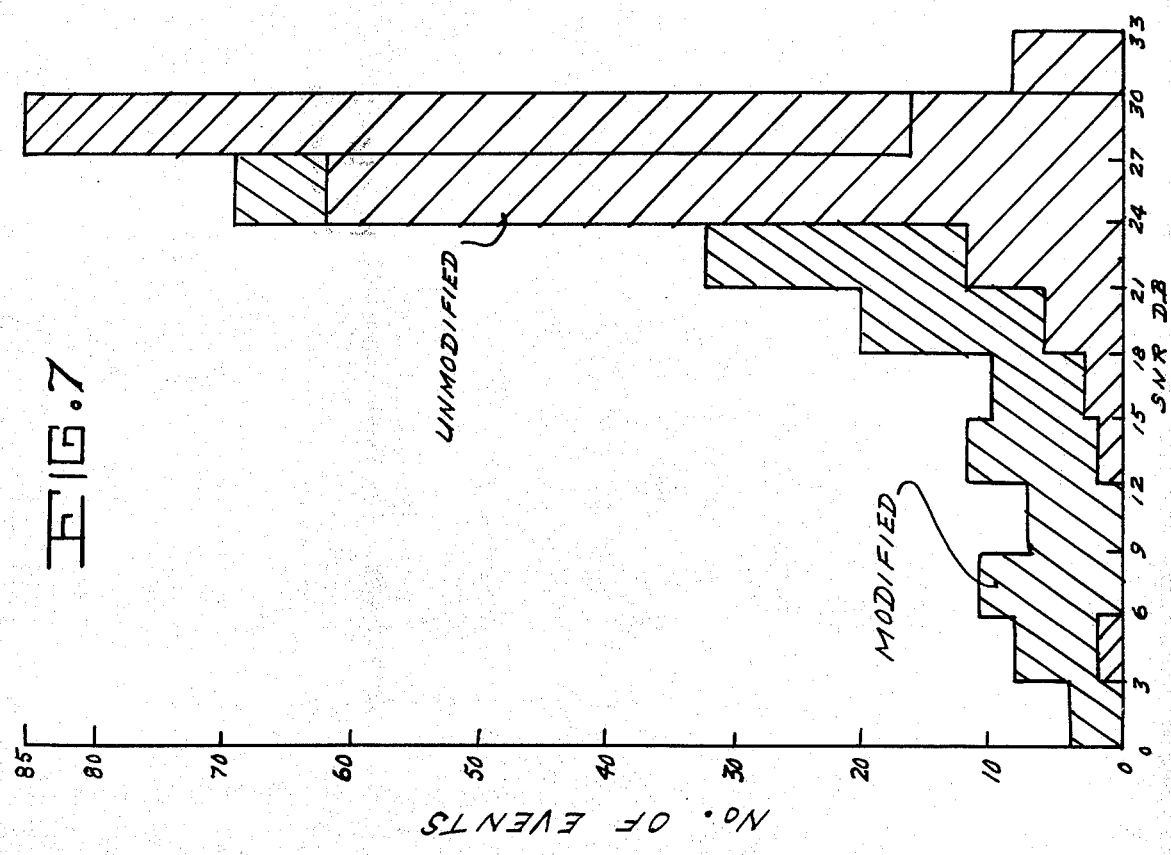
Figure 6:
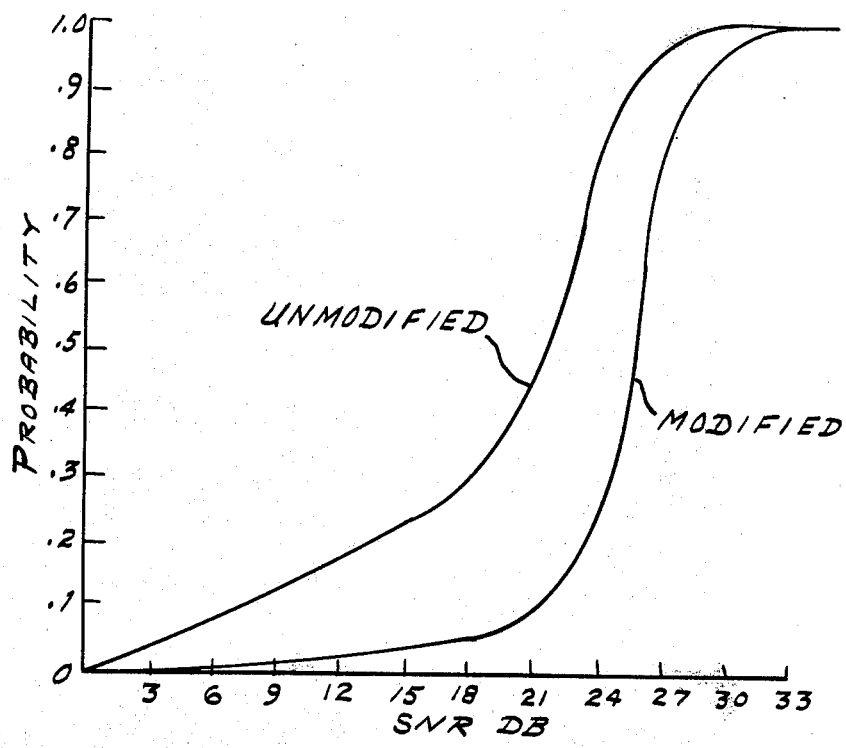
Figure 8:
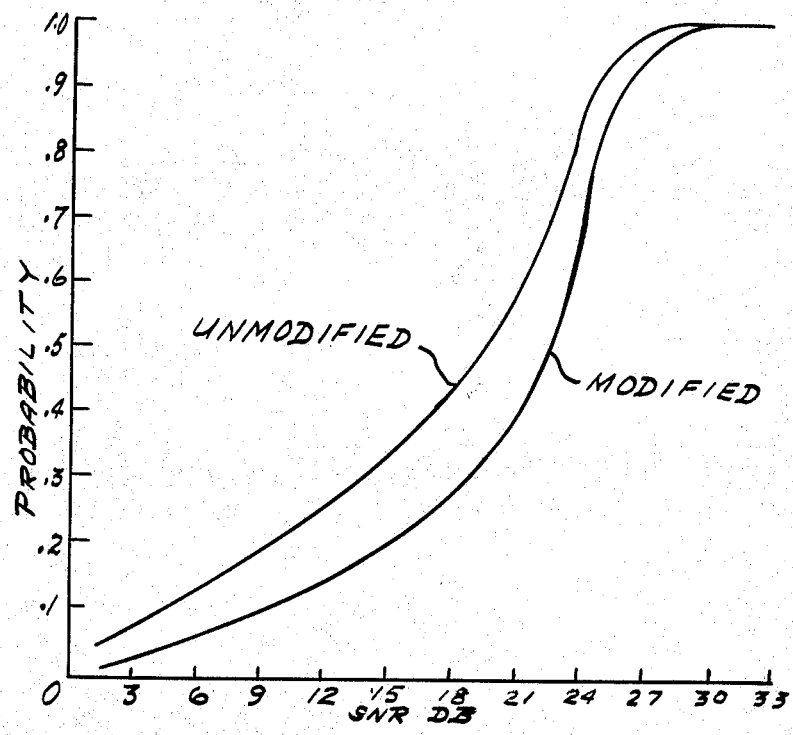
Figure 11:
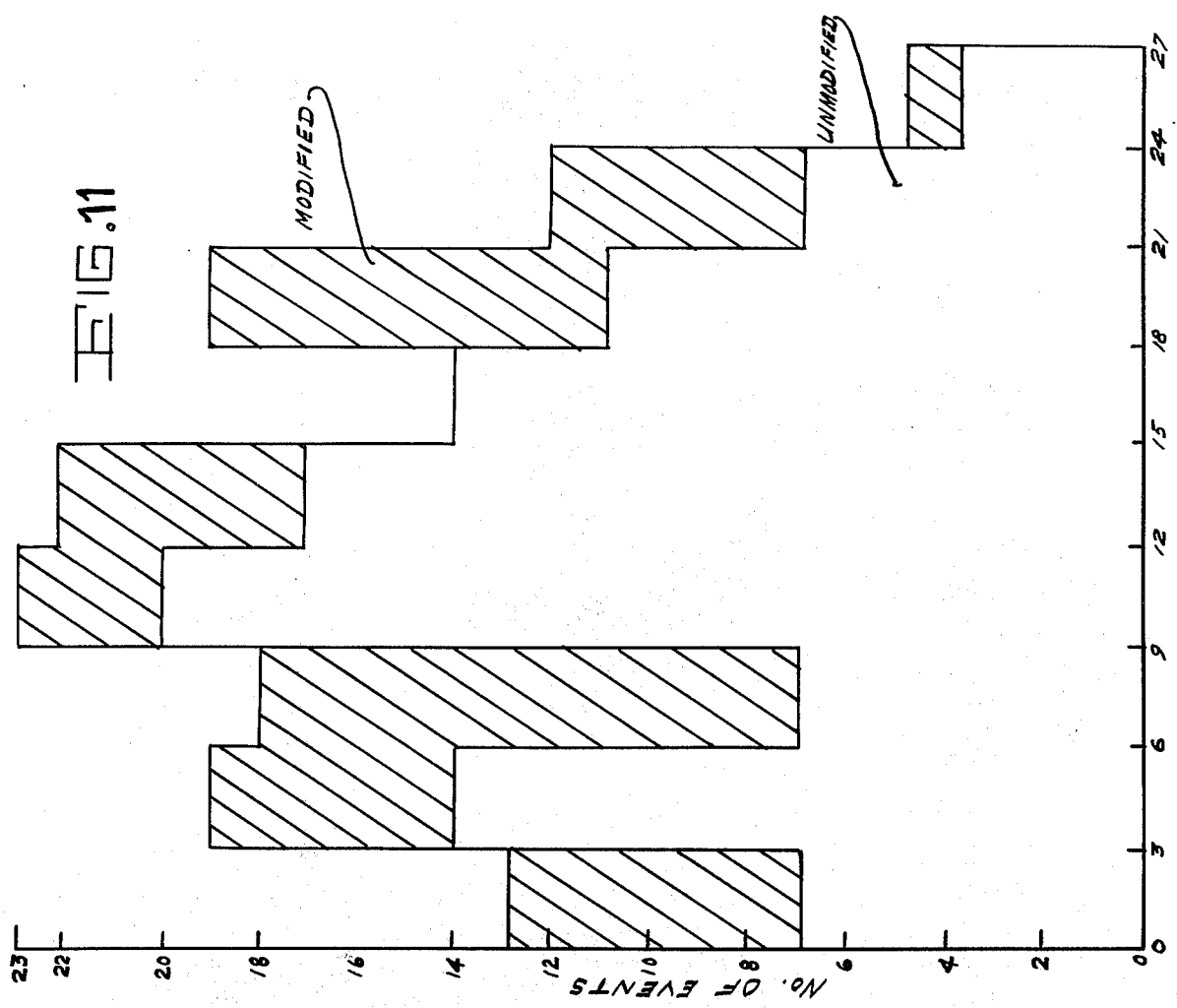
Figure 9:
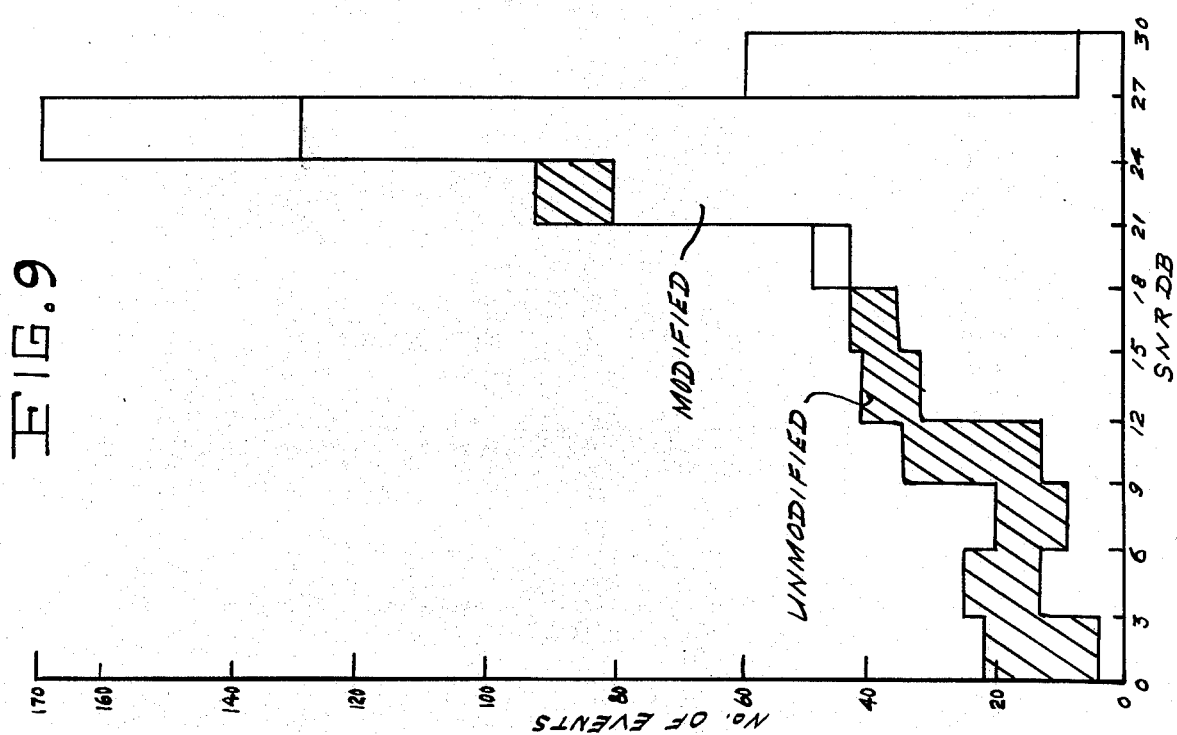
Figure 10:
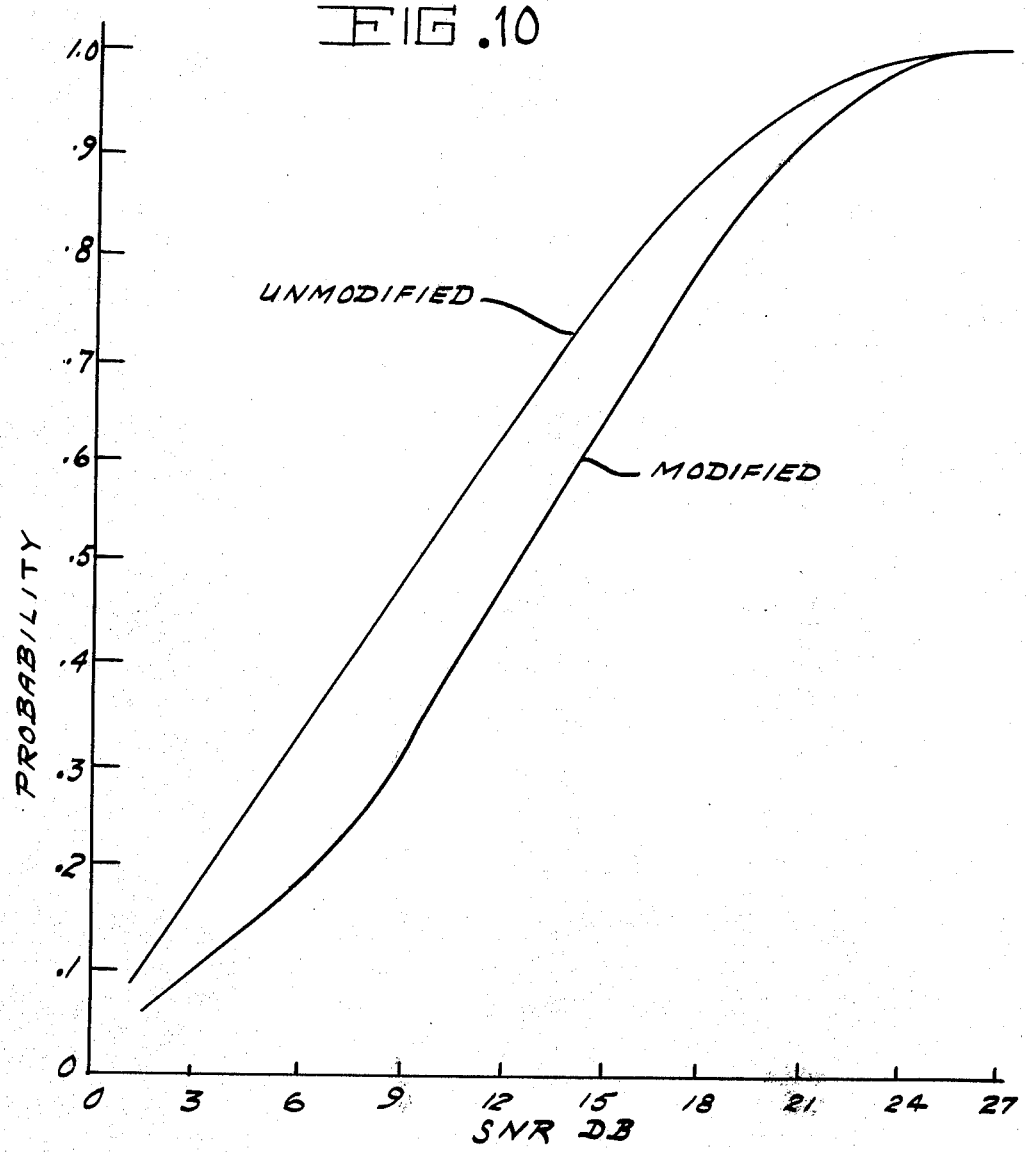
Figure 13:
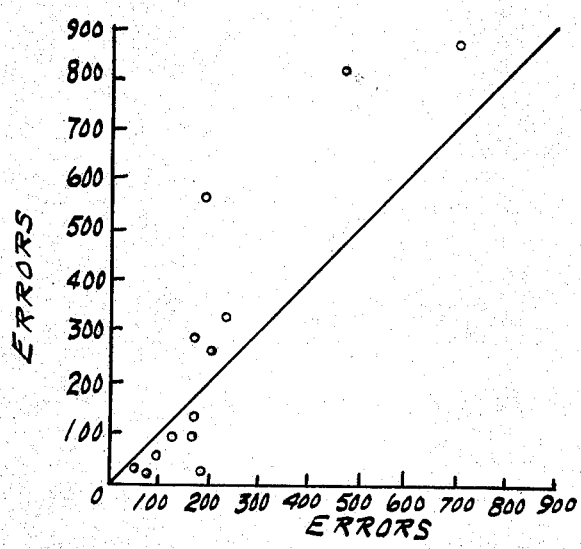

There is shown in FIGS. 4,6,8 and 10 a plot of the total probability distribution versus the baseband signal-to-noise ratio for a modified and an unmodified communications link from Youngstown to Verona. In FIGS. 5,7,9 and 11, there is shown a plot of the total probability densities versus the baseband signal-to-noise ratio for a modified and an unmodified communications link from Youngstown to Verona. There is shown in FIGS. 12 and 13 a plot of the errors in a modified versus an unmodified system on a transmission link between Youngstown and Ontario.

Although the invention has been described with reference to a particular embodiment, it will be understood to those skilled in the art that the invention is capable of a variety of alternative embodiments within the spirit and scope of the appended claims.

What is claimed is:

1. A system channel distortion weighting apparatus for predetection combiners comprising in combination:
   a plurality of diversity receiver channels respectively providing a plurality of I.F. signals, said plurality of diversity receiver channels each having a level control means connected thereto to control signal level within each receiver channel, said plurality of diversity receiver channels each having an amplitude distorted signal therein,
   summing means connected to each of said plurality of diversity receiver channels to sum each of said amplitude distorted signals therefrom, said summing means providing a summed amplitude distorted signal,
   means for envelope detecting said summed amplitude distorted signal, said detecting means providing a signal envelope representative of the distorted amplitude thereof,
   means for envelope detecting each of said amplitude distorted signals thereby providing a plurality of signal envelopes representative of the amplitude distortion in each of said signals, and
   means for correlating said distorted signal envelope of said summed signal with each of said plurality of amplitude distorted signal envelopes to provide an output voltage, said output voltage being proportional to the correlation between each of said amplitude distorted signal envelopes and said distorted signal envelope of said summed signal, control signal means producing means providing a level control signal in response to said output voltage, said level control signal being applied to each of said level control means, said level control means adjusting each diversity receiver channel gain in response to said level control signal.

* * * * *